United States Patent
Morita

(10) Patent No.: US 10,602,014 B2
(45) Date of Patent: Mar. 24, 2020

(54) IMAGE PROCESSING APPARATUS, CONTROL METHOD OF IMAGE PROCESSING APPARATUS, AND STORAGE MEDIUM

(71) Applicant: CANON KABUSHIKI KAISHA, Tokyo (JP)

(72) Inventor: Seijiro Morita, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/255,591

(22) Filed: Jan. 23, 2019

(65) Prior Publication Data
US 2019/0230243 A1    Jul. 25, 2019

(30) Foreign Application Priority Data
Jan. 24, 2018    (JP) ................ 2018-009832

(51) Int. Cl.
*H04N 1/203*    (2006.01)
*H04N 1/21*    (2006.01)
*H04N 1/00*    (2006.01)

(52) U.S. Cl.
CPC ....... *H04N 1/2034* (2013.01); *H04N 1/00915* (2013.01); *H04N 1/2104* (2013.01)

(58) Field of Classification Search
CPC . H04N 1/2034; H04N 1/00915; H04N 1/2104
USPC .................................................. 358/1.15
See application file for complete search history.

(56) References Cited

U.S. PATENT DOCUMENTS

2006/0187227 A1*  8/2006  Jung ................. H04N 1/00249
                                                345/536

FOREIGN PATENT DOCUMENTS

JP         2010226518 A      10/2010

* cited by examiner

*Primary Examiner* — Tammy Paige Goddard
*Assistant Examiner* — Darryl V Dottin
(74) *Attorney, Agent, or Firm* — Canon U.S.A., Inc. IP Division

(57) ABSTRACT

An image processing apparatus including two image reading units can sequentially execute image processing of front face image data and back face image data of a document using a single image processing circuit. The image processing apparatus transfers the first face image data of the read document to a first ring buffer and the second face image data thereof to a second ring buffer, respectively, while switching, predetermined unit by unit, whether to transfer the first face image data or the second face image data of the image data to an image processing unit.

11 Claims, 7 Drawing Sheets

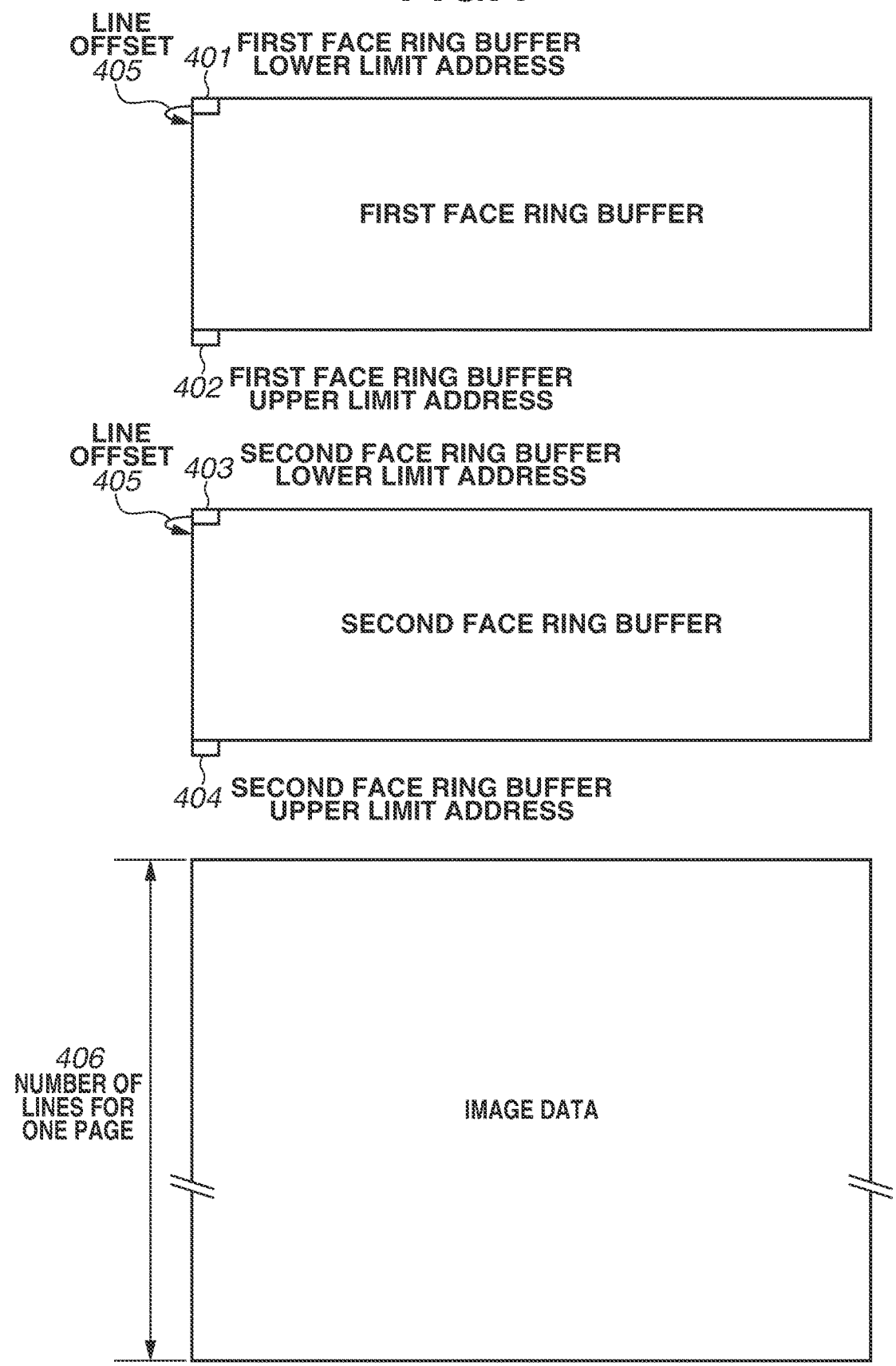

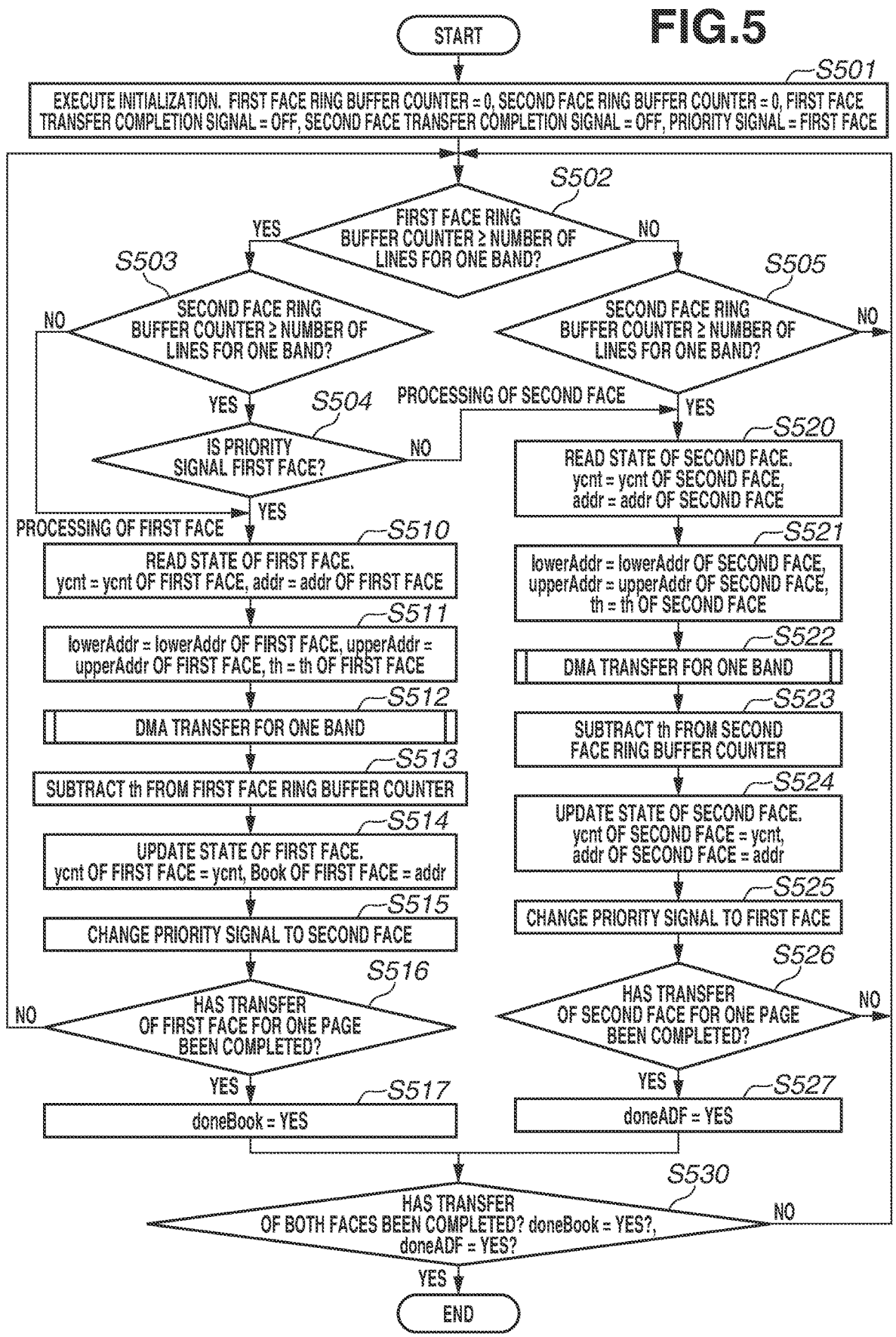

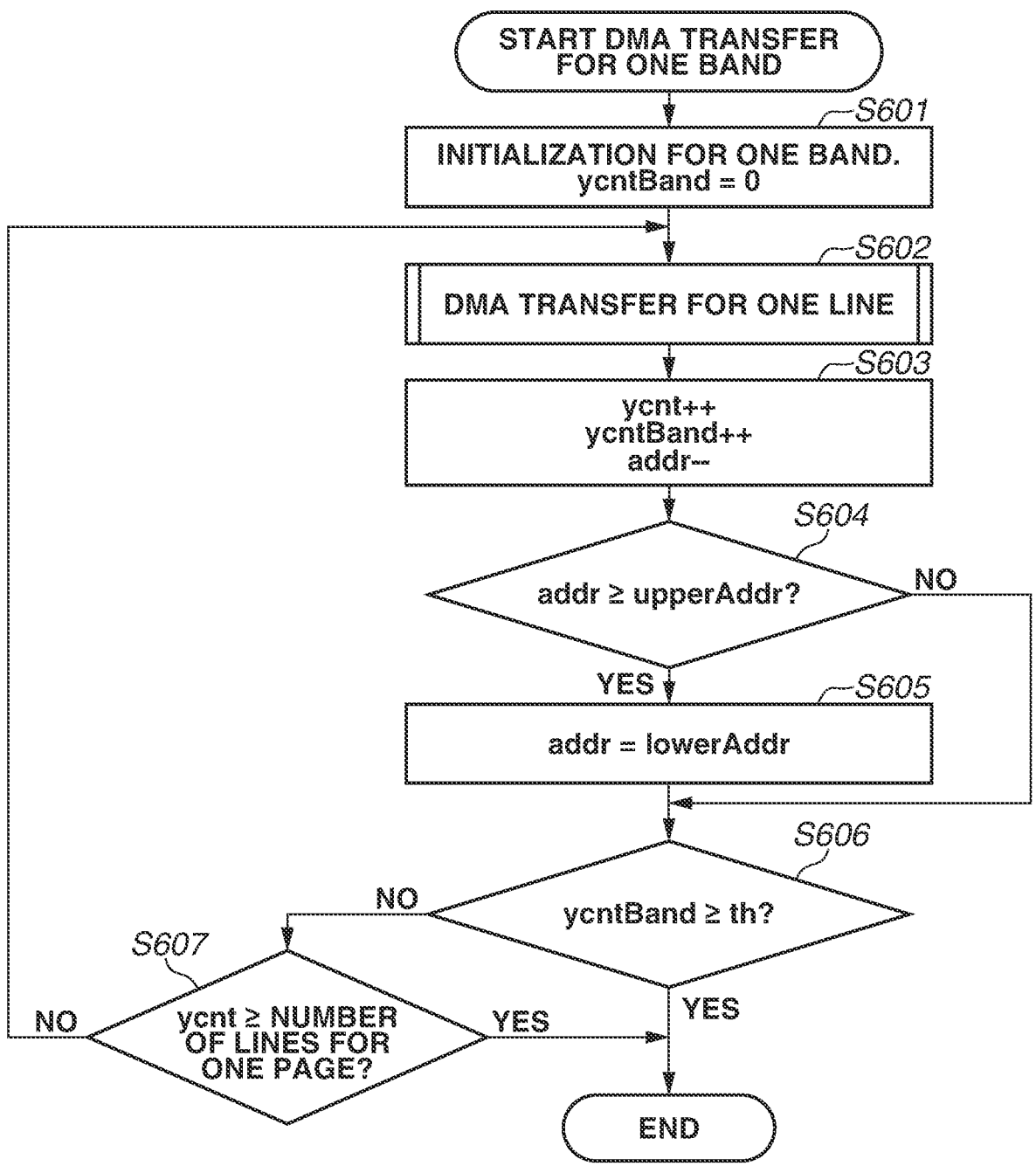

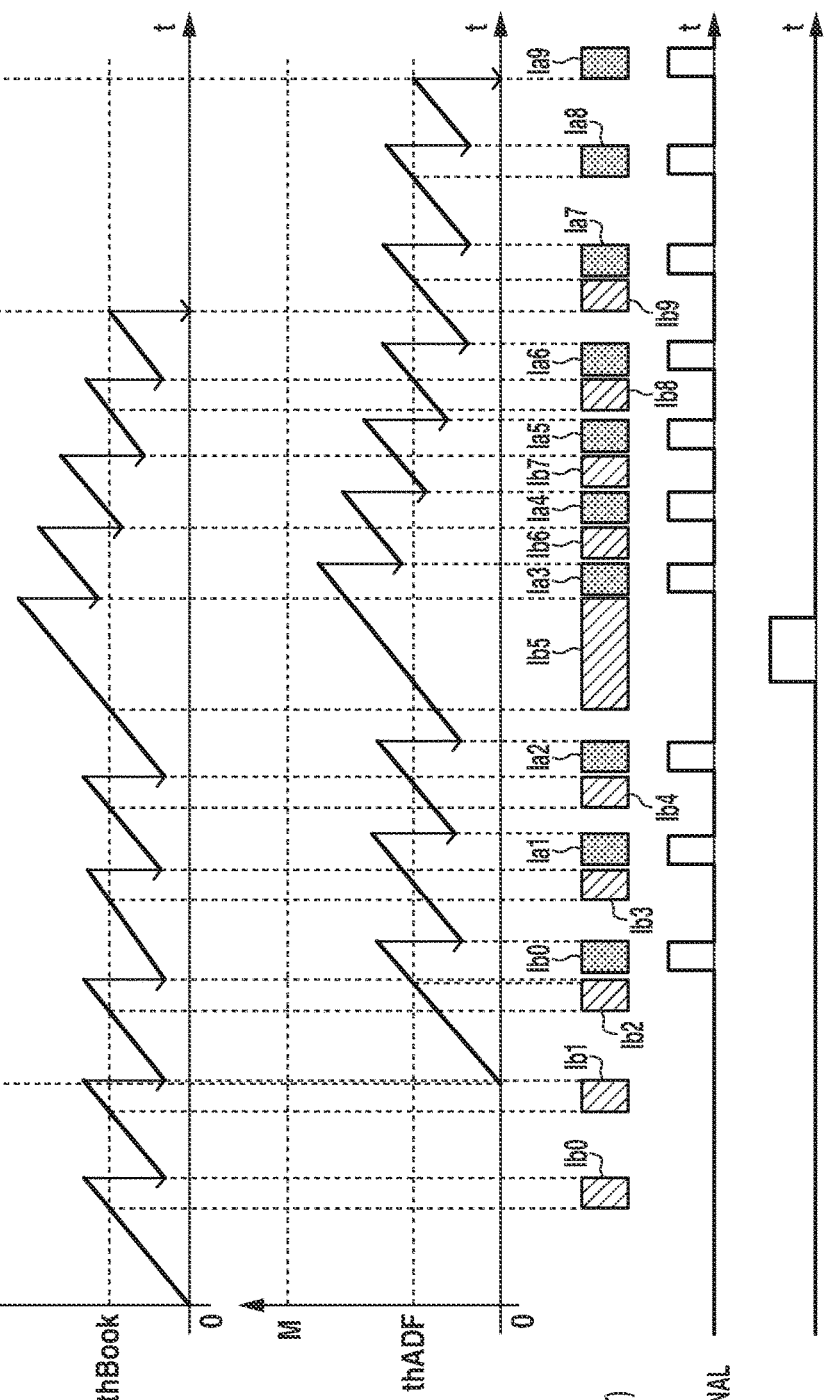

IMAGE PROCESSING APPARATUS, CONTROL METHOD OF IMAGE PROCESSING APPARATUS, AND STORAGE MEDIUM

BACKGROUND OF THE INVENTION

Field of the Invention

The present invention relates to an image processing apparatus capable of reading a front face and a back face of a document by a single reading operation, a control method, and a storage medium.

Description of the Related Art

Conventionally, there has been known an image reading apparatus that includes two image reading units for reading a front face and a back face of a document fed from an auto-document feeder by a single reading operation. Image data generated by reading the front face and the back face is transmitted to an external host computer or an image forming unit for forming an image on a recording medium such as a print sheet.

A size of a circuit will be increased if front face image data and back face image data are processed by respective image processing circuits. In a technique discussed in Japanese Patent Application Laid-Open No. 2010-226518, while image processing of front face image data is being executed, back face image data is temporarily stored in an image memory. Then, after the image processing of the front face image data is completed, image processing of the back face image data is executed using the same image processing circuit.

However, with the method described in Japanese Patent Application Laid-Open No. 2010-226518 in which the processing of the front face image data and the processing of the back face image data are sequentially executed in a chronological order, a memory is necessary that has a capacity for storing the back face image data corresponding to one page. This results in a cost increase.

In addition, in a case where reading processing of the front and back faces is executed continuously for a plurality of pages, processing of the back face image data has to be completed before reading processing of the subsequent front face image is started. Thus, it is necessary to have a sufficient time interval between the pages when the reading processing of documents is executed, whereby the reading performance can be lowered.

SUMMARY OF THE INVENTION

According to embodiments of the present invention, an image processing apparatus includes a first reading unit configured to read a first document face, a second reading unit configured to read a second document face, a first data transfer unit configured to transfer, first predetermined unit by unit, first image data of the first document face read by the first reading unit to a first temporary storage unit, a second data transfer unit configured to transfer, second predetermined unit by unit, second image data of the second document face read by the second reading unit to a second temporary storage unit, a third data transfer unit configured to transfer, third predetermined unit by unit, the first image data transferred to the first temporary storage unit and the second image data transferred to the second temporary storage unit to an image processing unit, and a priority determination unit configured to retain a priority signal indicating whether to prioritize transfer of the first image data or the second image data, wherein the third data transfer unit prioritizes and transfers either the first image data or the second image data to the image processing unit based on the priority signal.

Further features of the present invention will become apparent from the following description of exemplary embodiments with reference to the attached drawings.

BRIEF DESCRIPTION OF THE DRAWINGS

FIG. 4 is a diagram illustrating a method for specifying a ring buffer region in an image memory.

FIG. 5 is a flowchart illustrating processing executed by the DMAC.

FIG. 6 is a flowchart illustrating DMA processing for one band of the processing executed by the DMAC.

FIGS. 7A, 7B, 7C, 7D, 7E, 7F, and 7G are diagrams illustrating a relationship between DMA transfer of image data and a ring buffer counter.

DESCRIPTION OF THE EMBODIMENTS

Hereinafter, exemplary embodiments of the present invention will be described with reference to the appended drawings.

Figure 1:
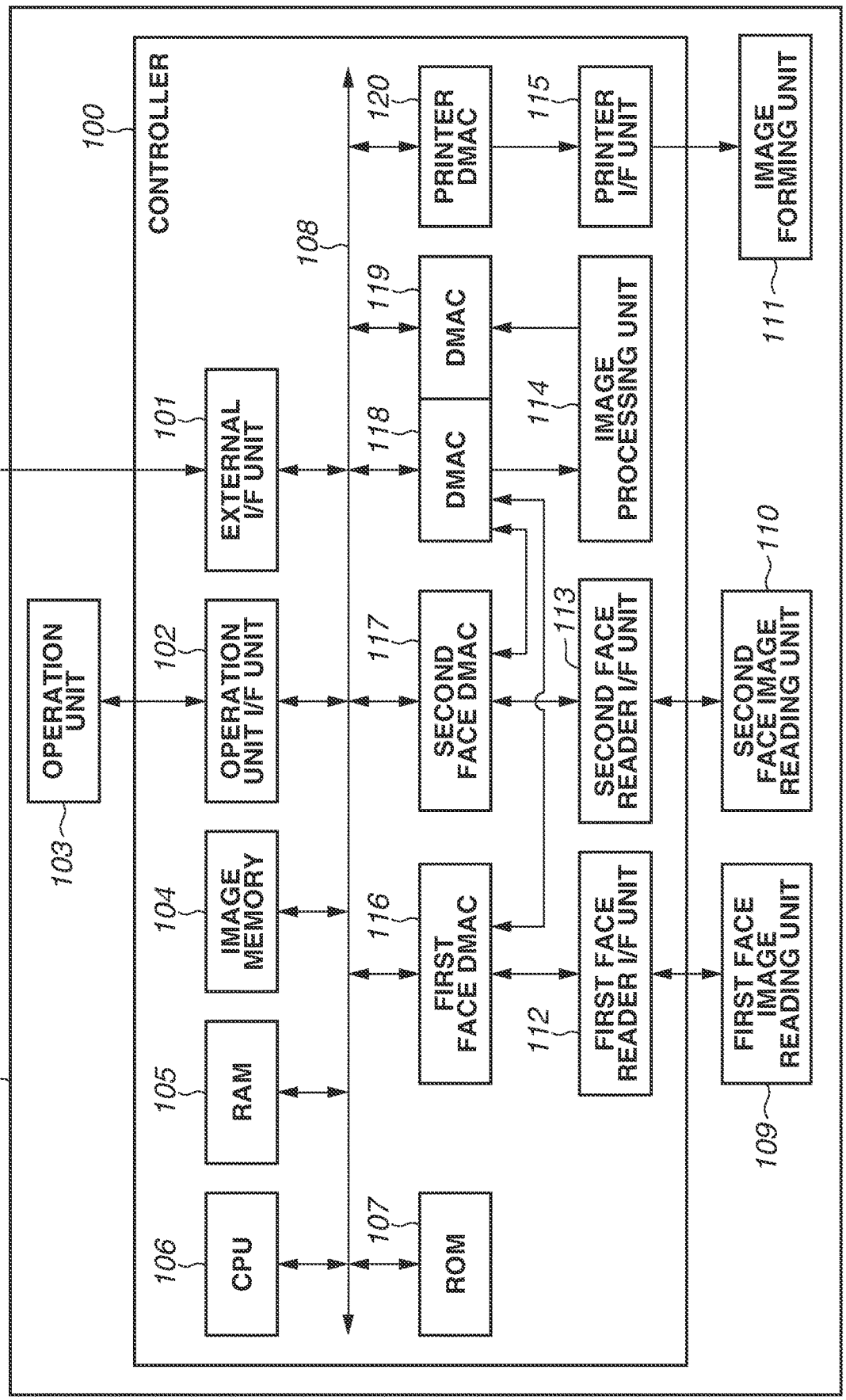
FIG. 1 is a block diagram illustrating a configuration of a multifunction peripheral.

FIG. 1 is a block diagram illustrating a configuration of a multi-function peripheral (MFP) as an example of an image reading apparatus according to exemplary embodiments of the present invention.

In the present exemplary embodiment, an MFP that integrally includes multiple functions such as a copying function, a scanning function, a printer function, and a facsimile function is used as an image reading apparatus. An MFP 1 is connected to a network via an external interface (I/F) unit 101, so that a printing instruction and apparatus information can be exchanged via the network.

A first face image reading unit 109 and a second face image reading unit 110 optically read a first document face (also called a front face or a Book face) and a second document face (also called a back face or an auto-document feeder (ADF) face) using respective image sensor units, and acquire image data of a predetermined density (e.g., 600 dpi). Each of the image sensor units includes a light source that emits light to the document, and an image sensor in which photoelectric conversion elements for reading reflected light from the document are arrayed.

The MFP 1 can read both faces of a two-sided document substantially simultaneously using the first face image reading unit 109 and the second face image reading unit 110 by a single sheet conveyance operation. A first face of a one-sided document or a two-sided document is read using the first face image reading unit 109, whereas a second face of the two-sided document is read using the second face image reading unit 110. As described above, both faces of the two-sided document are read substantially simultaneously by a single sheet conveyance operation, so that time required for reading the two-sided document can be reduced.

Various types of reading control of the first face image reading unit 109 and the second face image reading unit 110 are achieved by a controller 100.

The controller 100 includes a first face reader I/F unit 112 and a second face reader I/F unit 113. The first face image data read by the first face image reading unit 109 is input to the controller 100 via the first face reader I/F unit 112. Then, the first face image data is transferred to an image memory 104 by a first face direct memory access controller (DMAC) 116.

Similarly, the second face image data read by the second face image reading unit 110 is input to the controller 100 via the second face reader I/F unit 113, and is transferred to the image memory 104 by a second face DMAC 117.

The first face reader I/F unit 112 constitutes an input/output unit for transmitting a signal to or receiving a signal from the first face image reading unit 109, and controls communication with the first face image reading unit 109. Similarly, the second face reader I/F unit 113 constitutes an input/output unit for transmitting a signal to or receiving a signal from the second face image reading unit 110, and controls communication with the second face image reading unit 110.

An image processing unit 114 sequentially reads out the first face image data and the second face image data transferred to and stored in the image memory 104 for each band of predetermined lines via the DMAC 118 to execute various types of image processing. The image processing unit 114 sequentially reads image data of the first and the second faces, and processes the image data input to the controller 100 from the two image reading units 109 and 110 by the single image processing unit 114, so that the circuit size and the cost can be reduced.

The image data on which image processing has been executed by the image processing unit 114 is transferred again to the image memory 104 by the DMAC 119. The image processing unit 114 executes various types of image processing such as background color removal processing, color space conversion processing for image formation, coding/decoding processing, and pseudo-gradation processing.

The image data on which the pseudo-gradation processing has been executed and stored in the image memory 104 is read out by the printer DMAC 120 and transferred to the image forming unit 111 via the printer I/F unit 115.

An operator inputs an instruction to the MFP 1 via an operation unit 103 provided on the MFP 1, and the controller 100 controls a series of such instructions. Various instructions such as mode settings input via the operation unit 103 are received via an operation unit I/F unit 102. The operation unit I/F unit 102 constitutes an interface between the operation unit 103 and a central processing unit (CPU) 106.

Figure 2:
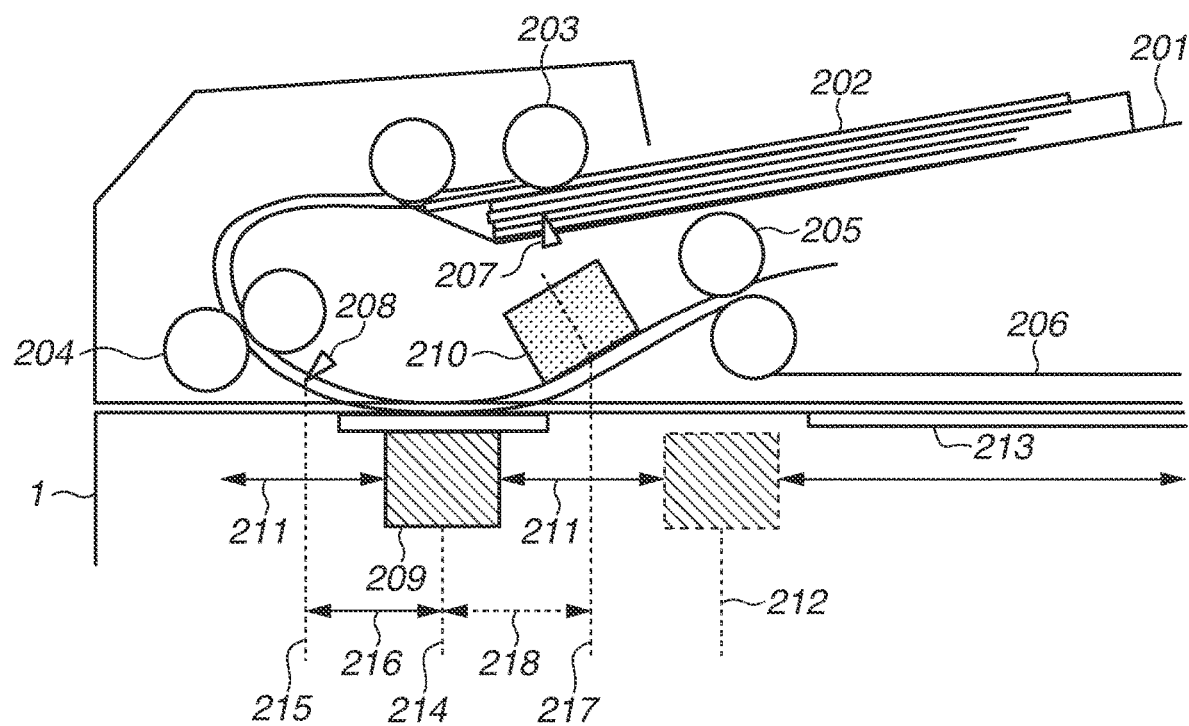
FIG. 2 is a cross-sectional diagram of an auto-document feeder (ADF).

The CPU 106 controls various blocks according to the instructions received from the operation unit 103 via the operation unit I/F unit 102. This control is executed based on a control program stored in a read only memory (ROM) 107. A random access memory (RAM) 105 is used as a work area for the CPU 106 to execute processing. Various blocks including the CPU 106 are connected to a system bus 108. FIG. 2 is a diagram schematically illustrating a cross-sectional view of a document conveyance path of an ADF. An operation of the ADF of the MFP 1 will be described with reference to FIG. 2.

A document stacking unit 201 is a stacking tray on which documents are stacked. To read the documents using the ADF, an uppermost document 202 stacked on the document stacking unit 201 is fed into the ADF via a feeding roller 203. The document 202 is conveyed by a conveyance roller 204 along a conveyance path, and reading processing is started when a leading edge of the document 202 has reached a first face reading position 214. Once the reading processing is started, the document 202 is read while being conveyed by a so-called moving document reading operation. The reading processing ends when the document 202 is read up to a trailing edge thereof or the predetermined number of documents have been read.

The read document 202 is discharged to a document discharge unit 206 by a discharge roller 205.

In the above-described configuration, the reading processing is started from the leading edge of the document, and the document is read up to the trailing edge thereof. However, the configuration is not limited thereto, and reading processing of a predetermined portion from a leading edge of the document may be started first, or reading processing of a predetermined portion from a trailing edge of the document may be executed later.

A first face image reading unit 209 is an image sensor unit for reading a first face of the document, and corresponds to the first face image reading unit 109 in FIG. 1. The first face of the document corresponds to an upper (Book) face of the document 202 stacked on the document stacking unit 201. The first face image reading unit 209 can be moved in a direction indicated with arrows 211 in FIG. 2, and is positioned at a stand-by position 212 in a period other than a reading processing period.

When the reading processing is executed by using the ADF, the first face image reading unit 209 stops at the first face reading position 214 and reads the first face of the document conveyed along the conveyance path.

A second face image reading unit 210 is an image sensor unit for reading a second face of the document, and corresponds to the second face image reading unit 110 in FIG. 1. The second face image reading unit 210 is fixed at a second face reading position 217 of the ADF, and reads the second face of the document conveyed along the conveyance path. The second face of the document corresponds to a lower (ADF) face of the document 202 stacked on the document stacking unit 201.

The first face image reading unit 209 and the second face image reading unit 210 are apart from each other by a reading unit interval distance 218. Thus, when simultaneous two-sided reading processing is executed, a first face document image position and a second face document image position in a read image are apart by the reading unit interval distance 218.

In the above-described configuration, although the second face image reading unit 210 is fixed to the ADF, the second face image reading unit 210 may also be movable so that the second face reading position 217 can be adjusted. In addition, the simultaneous two-sided reading processing refers to processing of reading images of the first (front) face and the second (back) face by a single sheet conveyance operation by using two image reading units.

A document sensor 207 detects presence or absence of a document on the document stacking unit 201. A document leading edge sensor 208 detects a leading edge position of the document 202 conveyed by the conveyance roller 204.

A sensor value is changed when the leading edge of the document 202 conveyed by the conveyance roller 204 has reached the document leading edge sensor 208, whereby the leading edge of the document 202 existing at a position 215 of the document leading edge sensor 208 can be detected. Further, the sensor value is changed when the trailing edge of the document 202 has passed the document leading edge sensor 208, whereby the leading edge of the document 202 existing at the position 215 of the document leading edge sensor 208 can be detected.

The reading processing is started and ended based on the detected leading edge and trailing edge positions of the document 202. The reading processing of the document 202 is started at a timing at which the document 202 is conveyed by a predetermined conveyance amount (i.e., conveyance amount for starting the reading processing) after the document leading edge sensor 208 has detected the leading edge position of the document 202. The reading processing of the document 202 is ended at a timing at which the document 202 is conveyed by a predetermined conveyance amount (i.e., conveyance amount for ending the reading processing) after the document leading edge sensor 208 has detected the trailing edge position of the document 202. The document leading edge sensor 208 serves as a reference position used for determining the timings for starting and ending the reading processing provided on the conveyance path.

The first face image reading unit 209 is used for reading a fixed document as well as for reading a document supplied from the ADF. In the reading processing of the fixed document, the first face image reading unit 209 reads the document placed on a fixed document reading face 213 while moving toward the fixed document reading face 213.

Figure 3:
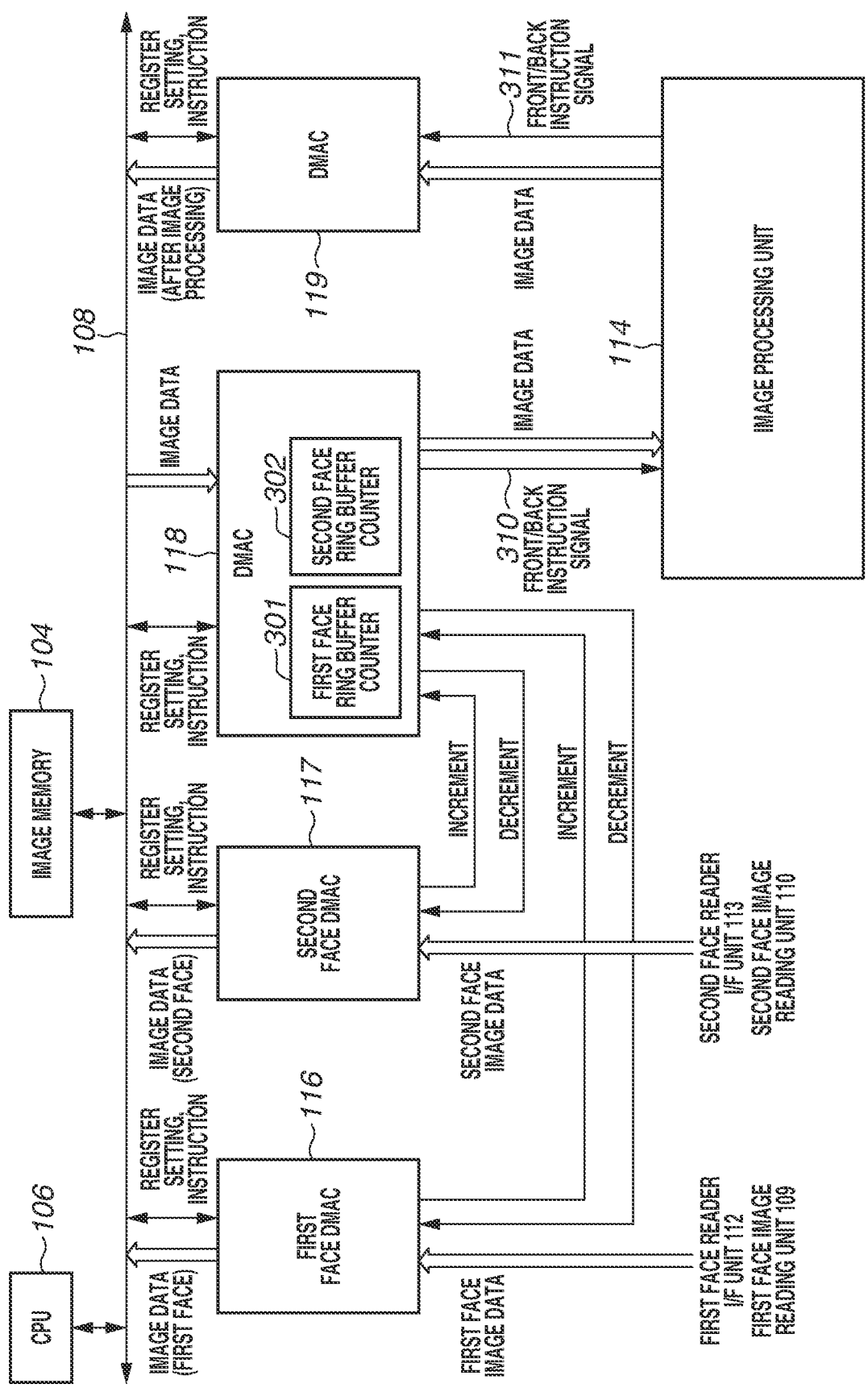
FIG. 3 is a block diagram illustrating a connection relationship of a bus and signals for a direct memory access controller (DMAC).

FIG. 3 is a diagram illustrating signals and a bus connected to the DMAC 118.

In the present exemplary embodiment, the first face DMAC 116 that transfers the first face image data, the second face DMAC 117 that transfers the second face image data, and the DMAC 118 that transfers image data to the image processing unit 114 use the image memory 104 as a ring buffer serving as a temporary storage unit.

The first face DMAC 116 transfers the first face image data by one line, and the second face DMAC 117 transfers the second face image data also by one line. The DMAC 118 reads out and transfers image data band by band (each band includes 32 lines).

As the ring buffer, 96 lines are secured in the image memory 104 to be used for transferring the first face image data and the second face image data. The ring buffer used for transferring the first face image is called a first face ring buffer, and the ring buffer used for transferring the second face image is called a second face ring buffer. (These ring buffers are also called a ring buffer Book and a ring buffer ADF, respectively.)

The CPU 106 provides an instruction to the first face DMAC 116, the second face DMAC 117, the DMAC 118, and the DMAC 119 by writing an appropriate value in a register (not illustrated) retained by each of the DMACs 116, 117, 118, and 119.

In the present exemplary embodiment, although a predetermined unit by which image data is read out and transferred by the DMAC 118 is specified as a unit of one band (32 lines), the image data may also be read out and transferred line by line.

A ring buffer counter, which is a counting unit included in each of the DMACs, refers to an amount of image data temporarily stored in the first face ring buffer or the second face ring buffer secured in the image memory 104. With this configuration, data transfer can be executed by the DMACs by using the image memory 104 as the ring buffer.

The first face DMAC 116 that transfers the first face image data transmits an increment instruction to the DMAC 118 when one line of image data received via the first face reader I/F unit 112 has been transferred to the first face ring buffer. The DMAC 118 receives the increment instruction and counts up a first face ring buffer counter 301.

On the other hand, when one band of image data has been read out from the first face ring buffer, the DMAC 118 decrements the first face ring buffer counter 301 and transmits a decrement instruction to the first face DMAC 116.

The DMAC 118 refers to the first face ring buffer counter 301 and executes data transfer processing based on a state of the first face ring buffer. With this configuration, data can be transferred from the first face DMAC 116 to the DMAC 118 without reading a region where the image data does not exist.

Similarly, the second face DMAC 117 that transfers the second face image data transmits an increment instruction to the DMAC 118 when one line of image data received via the second face reader I/F unit 113 has been transferred to the second face ring buffer. The DMAC 118 receives the increment instruction and counts up a second face ring buffer counter 302.

On the other hand, when one band of image data has been read out from the second face ring buffer, the DMAC 118 decrements the second face ring buffer counter 302 and transmits a decrement instruction to the second face DMAC 117.

The DMAC 118 refers to the second face ring buffer counter 302 and executes data transfer processing based on a state of the second face ring buffer. With this configuration, data can be transferred from the second face DMAC 117 to the DMAC 118 without reading a region where the image data does not exist.

Further, in the present exemplary embodiment, the DMAC 118 outputs a front/back instruction signal 310 to the image processing unit 114 together with the image data. The front/back instruction signal 310 indicates whether the image data has been read out from the first face ring buffer or the second face ring buffer.

With this configuration, the image processing unit 114 can determine whether to execute the processing for the first face or the second face based on the front/back instruction signal 310.

After the front/back instruction signal 310 is used in the image processing unit 114, the front/back instruction signal 310 is input to the DMAC 119 as a front/back instruction signal 311. Based on the front/back instruction signal 311, the DMAC 119 can transfer the first face image data and the second face image data to respective memory regions different from each other.

FIG. 4 is a diagram illustrating a method for specifying a ring buffer region secured in the image memory 104 to the DMAC 118.

A lower limit address 401 and an upper limit address 402 of the first face ring buffer, which is a ring buffer region used for transferring the first face image, are provided to a register portion (not illustrated) of the DMAC 118. A lower limit address 403 and an upper limit address 404 of the second face ring buffer, which is a ring buffer region used for transferring the second face image, are provided to the register portion (not illustrated) of the DMAC 118.

Furthermore, a line offset 405 of addresses of the adjacent lines of image data on the first face ring buffer and the second face ring buffer is provided to the register portion (not illustrated) of the DMAC 118.

The number of lines 406 for one page of the image data transferred by the DMAC 118 is also provided to the register portion (not illustrated) of the DMAC 118.

In the present exemplary embodiment, although the line offset 405 and the number of lines 406 for one page are described as the registers common to the first and second faces, a register may also be provided individually.

The DMAC 118 includes a start register (not illustrated) for starting DMA processing after completing settings including the setting of the above-described register.

Next, processing of the DMAC 118 will be described with reference to FIGS. 5 and 6. FIGS. 5 and 6 are flowcharts illustrating the processing executed by the DMAC 118 based on an instruction from the CPU 106.

When the DMA processing is started in response to the instruction of the CPU 106, in step S501, the DMAC 118 first executes initialization processing.

In the initialization processing, the first face ring buffer counter 301 and the second face ring buffer counter 302 indicating the number of lines of image data, which is a data amount temporarily stored in the ring buffer, are initialized.

Then, a transfer completion signal (doneBook) indicating completion of the first face image data transfer and a transfer completion signal (doneADF) indicating completion of the second face image data transfer are also initialized. If the reading processing of a one-sided document is executed, the transfer completion signal doneBook is initialized.

The DMAC 118 initializes a priority signal, which indicates which data transfer is to be prioritized between the first face image data transfer and the second face image data transfer, to "Book" that indicates priority in the first face, and retains the priority signal in a priority determination unit.

In step S502, the DMAC 118 checks a state of the first face ring buffer counter 301 and switches the processing of a next step.

If the first face ring buffer counter 301 is greater than or equal to the number of lines thBook (32 lines) for one band of the first face (YES in step S502), the DMAC 118 determines that the first face DMAC 116 has transferred data for one band (32 lines) or more to the first face ring buffer, and the processing proceeds to step S503.

In step S503, the DMAC 118 checks a state of the second face ring buffer counter 302 and switches the processing of a next step.

If the second face ring buffer counter 302 is greater than or equal to the number of lines thADF (32 lines) for one band of the second face (YES in step S503), the DMAC 118 determines that the second face DMAC 117 has transferred data for one band (32 lines) or more to the second face ring buffer, and the processing proceeds to step S504.

In steps S502 and S503, if in each of the first face ring buffer counter 301 and the second face ring buffer counter 302, the image data is accumulated by an amount greater than or equal to the number of lines thBook or thADF for one band, the processing is switched based on the priority signal. If the priority signal is "Book" (YES in step S504), the processing proceeds to step S510.

In step S503, if a value of the second face ring buffer counter 302 is less than the number of lines thADF for one band of the second face (NO in step S503), the processing also proceeds to step S510. This is because the DMAC 118 determines that only the first face image data is accumulated for one band, so that it is not necessary to check the priority signal.

On the other hand, in step S502, if a value of the first face ring buffer counter 301 is less than the number of lines thBook for one band of the first face (NO in step S502), the processing proceeds to step S505.

Similar to the processing in step S503, also in step S505, the DMAC 118 checks the state of the second face ring buffer counter 302.

In step S505, if a value of the second face ring buffer counter 302 is greater than or equal to the number of lines thADF for one band of the second face (YES in step S505), the DMAC 118 determines that the second face DMAC 117 has transferred data for one band or more to the second face ring buffer, and the processing proceeds to step S520. This is because the DMAC 118 determines that only the second face image data is accumulated for one band, so that it is not necessary to check the priority signal.

In step S505, if the value of the second face ring buffer counter 302 is less than the number of lines thADF for one band of the second face (NO in step S505), the DMAC 118 determines that both of the first face image data and the second face image data have not been accumulated for the number of lines for one band. Then, the processing returns to step S502.

In step S510, in order to transfer the first face image data for one band by DMA transfer processing, the DMAC 118 reads a state of the DMAC 118 relating to first face image data transfer processing.

First, the number of first face data transfer lines ycntBook is substituted for the number of data transfer lines ycnt. Then, a first face read-out address addrBook is substituted for a read-out address addr. Both of the number of first face data transfer lines ycntBook and the first face read-out address addrBook are registers (not illustrated) included in the DMAC 118.

In the present exemplary embodiment, an initial value of the number of first face data transfer lines ycntBook is 0, and an initial value of the first face read-out address addrBook is the lower limit address 401 of the first face ring buffer. The state read in step S510 is the state saved in step S514 described below.

In step S511, the DMAC 118 reads a register value relating to the first face ring buffer to a signal necessary for executing the DMA transfer processing for one band.

Herein, the lower limit address 401 of the first face ring buffer is substituted for a lower limit address lowerAddr, and the upper limit address 402 of the first face ring buffer is substituted for an upper limit address upperAddr. Further, the number of lines thBook for one band of the first face is substituted for the number of lines th for one band.

In step S512, based on the number of data transfer lines ycnt, the read-out address addr, the lower limit address lowerAddr, the upper limit address upperAddr, and the number of lines th for one band, the DMAC 118 executes the DMA transfer processing associated with a read-out request for one band.

The DMA transfer processing for one band executed by the DMAC 118 in step S512 will be described with reference to FIG. 6.

In step S601, the DMAC 118 initializes the number of data transfer lines ycntBand completed by the DMA transfer processing for one band.

In step S602, the DMAC 118 executes the DMA transfer processing associated with a read-out request for one line from the read-out address addr.

In step S603, the DMAC 118 increments the number of completed data transfer lines ycnt and the number of completed data transfer lines ycntBand in the DMA transfer processing for one band. The DMAC 118 also increments the read-out address addr by the line offset.

In step S604, the DMAC 118 determines whether the read-out address addr is the upper limit address upperAddr or greater, i.e., whether the read-out address addr exceeds the upper limit of the ring buffer region.

If the read-out address addr is the upper limit address upperAddr or greater (YES in step S604), the processing proceeds to step S605. If the read-out address addr is less than the upper limit address upperAddr (NO in step S604), the processing proceeds to step S606.

In step S605, by setting the read-out address addr to the lower limit address lowerAddr of the ring buffer, the DMAC 118 changes the next read-out address addr to an address in the ring buffer.

In step S606, the DMAC 118 determines whether the number of data transfer lines ycntBand has reached the number of lines th for one band. If the number of data transfer lines ycntBand has not reached the number of lines th for one band (NO in step S606), the processing proceeds to step S607. In step S607, in addition to the determination in step S606, the DMAC 118 determines whether the number of data transfer lines ycnt has reached the number of transfer lines 406 for one page. If the number of data transfer lines ycnt has not reached the number of data transfer lines 406 for one page (NO in step S607), the processing returns to step S602, and the DMA transfer processing is continued.

On the other hand, if the DMAC 118 determines that the number of transfer lines ycntBand has reached the number of transfer lines th for one band in step S606 (YES in step S606) or that the number of data transfer lines ycnt has reached the number of lines for one page (YES in S607), the DMA transfer processing for one band is ended.

When the DMA transfer processing for one band is ended, the processing returns to step S513 in FIG. 5.

In step S513, the DMAC 118 subtracts the number of lines th for one band from the first face ring buffer counter 301, and transmits a decrement instruction to the first face DMAC 116. With this instruction, the first face DMAC 116 can recognize that data of an amount corresponding to the number of lines th for one band has been transferred from the ring buffer.

Next, in step S514, the DMAC 118 updates the number of first face data transfer lines ycntBook with the number of data transfer lines ycnt, and updates the first face read-out address addrBook with the read-out address addr. Then, these updated values are stored in the register (not illustrated) included in the DMAC 118.

Then, in step S515, the priority signal is changed to ADF. With this processing, the DMAC 118 prioritizes the second face in the next image data transfer processing.

In step S516, the DMAC 118 checks whether the first face image data transfer processing for one page has been completed.

If the number of data transfer lines ycnt is greater than or equal to the number of lines 406 for one page, the DMAC 118 determines that the data transfer processing for one page has been completed (YES in step S516), and the processing proceeds to step S517. If the number of data transfer lines ycnt is less than the number of lines 406 for one page (NO in step S516), the processing returns to step S502, and the DMA processing is continued.

In step S520, in order to transfer the second face image data for one band by the DMA transfer processing, the DMAC 118 reads a state of the DMAC 118 relating to the second face image data transfer processing.

First, the number of second face data transfer lines ycntADF is substituted for the number of data transfer lines ycnt. Then, a second face read-out address addrADF is substituted for the read-out address addr. Both of the number of second face data transfer lines ycntADF and the second face read-out address addrADF are registers (not illustrated) included in the DMAC 118.

In the present exemplary embodiment, an initial value of the number of second face data transfer lines ycntADF is 0, and an initial value of the second face read-out address addrADF is the lower limit address 403 of the second face ring buffer. The state written in step S520 is the state saved in step S524 described below.

In step S521, the DMAC 118 reads a register value relating to the second face ring buffer to a signal necessary for executing the DMA transfer processing for one band.

Herein, the lower limit address 403 of the second face ring buffer is substituted for the lower limit address lowerAddr, and the upper limit address 404 of the second face ring buffer is substituted for the upper limit address upperAddr. Further, the number of lines thADF for one band of the second face is substituted for the number of lines th for one band.

In step S522, based on the number of data transfer lines ycnt, the read-out address addr, the lower limit address lowerAddr, the upper limit address upperAddr, and the number of lines th for one band, the DMAC 118 executes the DMA transfer processing associated with a read-out request for one band. The processing in step S522 is similar to the processing in step S512.

When the DMA transfer processing for one band is ended, in step S523, the DMAC 118 subtracts the number of lines th for one band from the second face ring buffer counter 302, and transmits a decrement instruction to the second face DMAC 117. With this instruction, the second face DMAC 117 can recognize that data for the number of lines th for one band has been transferred from the ring buffer.

Next, in step S524, the DMAC 118 updates the number of second face data transfer lines ycntADF with the number of data transfer lines ycnt, and updates the second face read-out address addrADF with the read-out address addr. Then, these updated values are stored in the register (not illustrated) included in the DMAC 118.

Then, in step S525, the priority signal is changed to Book. With this processing, the DMAC 118 prioritizes the first face in the next image data transfer processing.

In step S526, the DMAC 118 checks whether the second face image data transfer processing for one page has been completed.

If the number of data transfer lines ycnt is greater than or equal to the number of lines for one page, the DMAC 118 determines that the data transfer processing for one page has been completed (YES in step S526), and the processing proceeds to step S527. If the number of data transfer lines ycnt is less than the number of lines 406 for one page (NO in step S526), the processing returns to step S502, and the DMA processing is continued.

As described above, in steps S510 and S511 or in steps S520 and S521, the DMAC 118 reads the state and the register value of the first face or the second face, and saves the state of the DMAC 118 in step S514 or S524. With this configuration, image processing of image data of both of the front face and the back face can be executed without providing a plurality of image processing circuits for executing the DMA processing for one band.

After the processing in steps S502 to S505, steps S510 to S516, and steps S520 to S526 are executed repeatedly, if the DMAC 118 confirms that the first face image data transfer processing for one page has been completed in step S516, the processing proceeds to step S517.

In step S517, the DMAC 118 sets a transfer completion signal doneBook indicating completion of the first face image data transfer processing to YES. At this time, the DMAC 118 may transmit an interruption signal (not illustrated) indicating completion of the first face image data transmission processing to the CPU 106.

On the other hand, in step S526, if the DMAC 118 confirms that the second face image data transfer processing for one page has been completed, the processing proceeds to step S527.

In step S527, the DMAC 118 sets a transfer completion signal doneADF indicating completion of the second face image data transfer processing to YES. At this time, the DMAC 118 may transmit an interruption signal (not illustrated) indicating completion of the second face image data transmission processing to the CPU 106.

In step S530, the DMAC 118 confirms whether transmission processing of both of the first face image data and the second face image data has been completed.

If the transmission processing has been completed for only one of the first face image data and the second face image data (NO in step S530), the processing returns to step S502, and the processing steps are repeated until the transmission processing of the other image data is completed.

If transmission processing has been completed for both of the first face image data and the second face image data (YES in step S530), the DMAC 118 ends the DMA processing. At this time, the DMAC 118 transmits an interruption signal (not illustrated) indicating completion of the transmission processing of the first face image data and the second face image data to the CPU 106. By detecting the interruption signal, the CPU 106 can detect the end of the DMA processing.

FIGS. 7A, 7B, 7C, 7D, 7E, 7F, and 7G are diagrams illustrating the DMA processing executed in the flowcharts in FIGS. 5 and 6, transfer timings of image data, and changes in values of the ring buffer counters.

A horizontal axis represents time t. Time at which input of the first face image data from the first face reader I/F unit 112 is started is specified as 0.

FIG. 7A is a diagram illustrating a state where the first face image data is input to the first face DMAC 116 from the first face reader I/F unit 112. FIG. 7B is a diagram illustrating a state where the second face image data is input to the second face DMAC 117 from the second face reader I/F unit 113. As illustrated in FIG. 2, difference in input timings of the first face image data and the second face image data is dependent on the positions of the image sensor units.

FIG. 7C is a diagram illustrating a change in a value of the first face ring buffer counter 301 included in the DMAC 118. FIG. 7D is a diagram illustrating a change in a value of the second face ring buffer counter 302 included in the DMAC 118.

First, the first face DMAC 116 transfers the first face image data by one line and transmits an increment instruction to the DMAC 118.

The DMAC 118 that has received the increment instruction counts up the first face ring buffer counter 301 every time the increment instruction is received. When the first face ring buffer counter 301 exceeds the number of lines thBook for one band of the first face, the DMAC 118 starts the DMA processing (see FIG. 6) for one band of the first face image data.

FIG. 7E is a diagram illustrating a state where the DMAC 118 transfers image data of the first face or the second face to the image processing unit 114.

In FIG. 7E, image data corresponding to a first one band of the first face image data is denoted by Ib0, image data corresponding to subsequent bands thereof are denoted by Ib1, Ib2, etc. Image data corresponding to a first one band of the second face image data is denoted by Ia0, image data corresponding to subsequent bands thereof are denoted by Ia1, Ia2, etc.

When transfer processing of the image data Ib0 corresponding to the first one band of the first face image data is completed, the first face ring buffer counter 301 is decremented by a value equivalent to one band. Subsequently, the first face ring buffer counter 301 is repeatedly incremented or decremented until transfer processing of data for one page is completed.

On the other hand, when input of the second face image data is started, the second face DMAC 117 transfers image data by one line and transmits an increment instruction to the DMAC 118. The DMAC 118 that has received the increment instruction counts up the second face ring buffer counter 302 every time the increment instruction is received.

When the second face ring buffer counter 302 exceeds the number of lines thADF for one band of the second face, the DMAC 118 starts the DMA processing (see FIG. 6) for one band of the second face image data.

FIG. 7F is a diagram illustrating a state where the DMAC 118 transmits a front/back instruction signal 310 indicating whether the image data is the first face image data or the second face image data together with the image data when the second face image data is transferred to the image processing unit 114.

When transfer processing of the image data Ia0 corresponding to the first one band of the second face image data is completed, the second face ring buffer counter 302 is decremented by a value equivalent to one band. Subsequently, the second face ring buffer counter 302 is repeatedly incremented or decremented until transfer processing of data for one page is completed.

When the processing is executed normally, the DMAC 118 refers to the values of the first face ring buffer counter 301 and the second face ring buffer counter 302 to execute DMA transfer processing in a band unit every time the image data is accumulated in the ring buffer in the image memory 104.

However, there is a case where the processing cannot be executed normally if the image processing unit 114 cannot receive the image data temporarily or transfer processing executed by the DMAC 118 is stagnated because of insufficiency of bands of the system bus 108. In this case, there is a possibility that image data of both the first face and the second face are accumulated exceeding the number of lines (thBook or thADF) for one band.

As one example of the above-described state, FIG. 7G illustrates a stalled state where the image processing unit 114 cannot receive the image data temporarily.

At this time, although transfer of the first face image data to the image processing unit 114 is stagnated, the image data is continued to be accumulated by the first face DMAC 116 and the second face DMAC 117. Thus, the values of the first face ring buffer counter 301 and the second face ring buffer counter 302 are increased. Then, there is a possibility that the first face ring buffer counter 301 exceeds the number of lines thBook for one band of the first face when transfer of the first face image data Ib5 is completed and that the second face ring buffer counter 302 exceeds the number of lines thADF for one band of the second face.

In the above-described state, in step S504, the DMAC 118 determines which image data is to be prioritized and transferred between the first face image data and the second face image data. Herein, the DMAC 118 prioritizes and transfers the second face image data Ia3.

By executing the above-described processing flow, image processing of the front face image data and image processing of the back face image data can be sequentially executed by a single image processing circuit.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-009832, filed Jan. 24, 2018, which is hereby incorporated by reference herein in its entirety.

What is claimed is:

1. An image processing apparatus comprising:
a first reader that reads an image of one side of a document, wherein first image data is generated based on the image read by the first reader;
a second reader that reads an image of the other side of the document, wherein second image data is generated based on the image read by the second reader;
an image processor;
a first memory that stores the first image data;
a second memory that stores the second image data; and
a controller that executes a first process for transferring a predetermined amount of the first image data stored by the first memory to the image processor, or executes a second process for transferring a predetermined amount of the second image data stored by the second memory to the image processor,
wherein, in a case where the first memory stores the predetermined amount of the first image data and the second memory does not store the predetermined amount of the second image data, the controller executes the first process,
wherein, in a case where the first memory does not store the predetermined amount of the first image data or the second memory stores the predetermined amount of the second image data, the controller executes the second process,
wherein, in a case where the first memory stores the predetermined amount of the first image data and the second memory stores the predetermined amount of the second image data, the controller executes a process which is different from a process which was executed last time by the controller from among the first process and the second process, and
wherein the controller executes the first process repeatedly before the predetermined amount of the second image data is stored by the second memory.

2. The image processing apparatus according to claim 1, wherein the first reader reads a front side of the document, and the second reader reads a back side of the document.

3. The image processing apparatus according to claim 2, wherein reading processing of the front side of the document executed by the first reader and reading processing of the back side of the document executed by the second reader are executed substantially simultaneously.

4. The image processing apparatus according to claim 1, wherein the first memory is a first ring buffer, and the second memory is a second ring buffer.

5. The image processing apparatus according to claim 1, wherein the controller outputs, to the image processor, a front/back instruction signal indicating that either the first image data or the second image data has been transferred to the image processor.

6. The image processing apparatus according to claim 1, wherein the controller executes a first counting process for counting an amount of data stored in the first memory, and a second process for counting an amount of data stored in the second memory.

7. The image processing apparatus according to claim 6, further comprising:
a first memory controller that counts, based on execution of the first counting process by the controller, the amount of data stored in the first memory; and
a second memory controller that counts, based on execution of the second counting process by the controller, the amount of data stored in the second memory,
wherein the first memory controller increments a count after transferring the predetermined amount of the first image data to the first memory, and
wherein the second memory controller increments a count after transferring the predetermined amount of the second image data to the second memory.

8. The image processing apparatus according to claim 7, wherein the first memory controller decrements the count when the predetermined amount of the first image data is transferred to the image processor, and
wherein the second memory controller decrements the count when the predetermined amount of the second image data is transferred to the image processor.

9. The image processing apparatus according to claim 1, wherein the predetermined amount is an amount of 32 lines of image data.

10. A control method of an image processing apparatus, the method comprising:
reading an image of one side of a document by first reading, wherein first image data is generated based on the image read by the first reading;
reading an image of the other side of the document by second reading, wherein second image data is generated based on the image read by the second reading;

in a case where a first memory stores a predetermined amount of the first image data and a second memory does not store a predetermined amount of the second image data, executing a first process for transferring the predetermined amount of the first image data stored by the first memory to an image processor;

in a case where the first memory does not store the predetermined amount of the first image data or the second memory stores the predetermined amount of the second image data, executing a second process for transferring the predetermined amount of the second image data stored by the second memory to the image processor; and in a case where the first memory stores the predetermined amount of the first image data and the second memory stores the predetermined amount of the second image data, executing a process which is different from a process which was executed last time from among the first process and the second process, wherein the first process is executed repeatedly before the predetermined amount of the second image data is stored by the second memory.

11. A non-transitory computer-readable storage medium that stores a program for causing a computer to execute a control method of an image processing apparatus, the control method comprising:

reading an image of one side of a document by first reading, wherein first image data is generated based on the image read by the first reading;

reading an image of the other side of the document by second reading, wherein second image data is generated based on the image read by the second reading;

in a case where a first memory stores a predetermined amount of the first image data and a second memory does not store a predetermined amount of the second image data, executing a first process for transferring the predetermined amount of the first image data stored by the first memory to an image processor;

in a case where the first memory does not store the predetermined amount of the first image data or the second memory stores the predetermined amount of the second image data, executing a second process for transferring the predetermined amount of the second image data stored by the second memory to the image processor; and in a case where the first memory stores the predetermined amount of the first image data and the second memory stores the predetermined amount of the second image data, executing a process which is different from a process which was executed last time from among the first process and the second process, wherein the first process is executed repeatedly before the predetermined amount of the second image data is stored by the second memory.

* * * * *